US006791973B1

(12) United States Patent
Yahiro

(10) Patent No.: US 6,791,973 B1
(45) Date of Patent: Sep. 14, 2004

(54) INTERNET TELEPHONE SYSTEM

(75) Inventor: Kazuo Yahiro, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 827 days.

(21) Appl. No.: 09/617,901

(22) Filed: Jul. 17, 2000

(30) Foreign Application Priority Data

Jul. 16, 1999 (JP) ............................................ 11-203089

(51) Int. Cl.$^7$ ............................................ H04C 12/66
(52) U.S. Cl. ...................................... 370/352; 379/700
(58) Field of Search ................................ 370/351–356, 370/401–402, 389, 259–260; 379/88.13–88.17, 900

(56) References Cited

U.S. PATENT DOCUMENTS

| | | | | | |
|---|---|---|---|---|---|
| 6,011,794 | A | * | 1/2000 | Mordowitz et al. | 370/352 |
| 6,078,579 | A | * | 6/2000 | Weingarten | 370/352 |
| 6,243,376 | B1 | * | 6/2001 | Ng et al. | 370/352 |
| 6,324,280 | B2 | * | 11/2001 | Dunn et al. | 370/352 |
| 6,377,570 | B1 | * | 4/2002 | Vaziri et al. | 370/352 |
| 6,424,647 | B1 | * | 7/2002 | Ng et al. | 370/352 |
| 6,430,176 | B1 | * | 8/2002 | Christie, IV | 370/352 |
| 6,430,178 | B1 | * | 8/2002 | Yahiro | 370/356 |
| 6,473,423 | B1 | * | 10/2002 | Tebeka et al. | 370/352 |
| 6,480,581 | B1 | * | 11/2002 | Wu et al. | 370/352 |
| 6,542,498 | B2 | * | 4/2003 | Socaciu | 370/352 |
| 6,584,094 | B2 | * | 6/2003 | Maroulis et al. | 370/352 |
| 6,636,506 | B1 | * | 10/2003 | Fan | 370/352 |

FOREIGN PATENT DOCUMENTS

| | | | |
|---|---|---|---|
| JP | 11225218 | | 8/1999 |
| WO | WO 98/11704 | * | 3/1998 |

* cited by examiner

*Primary Examiner*—Steven Nguyen
(74) *Attorney, Agent, or Firm*—RatnerPrestia

(57) ABSTRACT

A calling side ISDN terminal adapter (TA) judges if Internet call is possible or not when the telephone number of a destination side telephone set is specified by a calling side telephone set. If judged possible, a predetermined number, and ciphered Internet connection member identification number and password are set on the sub-address of call setting, and sent out to a destination side ISDN TA. When receiving the predetermined number, the destination side ISDN TA rings the bell of the destination side telephone set, and when it is off the hook, it connects to the destination side access point by the Internet connection member identification number and password, and notifies the calling side ISDN TA by putting the destination side IP address acquired at the destination side access point on the sub-address of call setting.

8 Claims, 16 Drawing Sheets

FIG. 10

|   | Password |
|---|---|
| W | 1234 |
| X | 5425 |
| Y | 4585 |
| Z | 3690 |

FIG. 13

| | A company Dial-up telephone Number |
|---|---|
| W | 06-□□□□□ |
| X | 052-△△△△△△ |
| Y | 092-○○○○○○ |
| Z | 045-■■■■■■ |

:

INTERNET TELEPHONE SYSTEM

BACKGROUND OF THE INVENTION

1. Field of the Invention

The present invention relates to an Internet telephone system for making a long-distance call at a low charge by using the Internet.

2. Description of the Related Art

A voice communication system using the wide-area data communication network of the Internet, known as the Internet telephone system, is disclosed, for example, in Japanese Laid-open Patent H11-225218.

In the Internet telephone system disclosed in Japanese Laid-open Patent H11-225218, when it is ready to make an Internet call, it is notified between ISDN terminal adapters (TA), by an exchange of sub-addresses or a user-user information notice, and the calling side and destination side ISDN TA automatically dial up to the Internet, and an Internet call is started.

FIG. 16 is a configuration showing the conventional Internet telephone system disclosed in the publication. FIG. 17 is a sequence diagram showing the operation of the conventional Internet telephone system.

The conventional Internet telephone system shown in FIG. 16 and FIG. 17 makes an Internet call in the following procedure.

(1) The destination side ISDN TA 105 receives a call setting 104 including a sub-address of a predetermined number from the calling side ISDN TA 102.

(2) The TA 105, receiving the call setting 104, rings the bell of a destination side telephone set 106 connected to itself.

(3) The TA 105 detects when the user hooks up the telephone set 106, and connects to a destination side access point 109.

(4) After connection, the TA 105 puts the predetermined number and acquired IP address on the sub-address of a call setting 107, and sends out to the calling side ISDN TA 102.

(5) The TA 102 receives the predetermined number and the IP address acquired at the destination side as the sub-address of the call setting 107, and connects to a calling side access point 108.

(6) After connection, the TA 102 sends the calling side IP address to the destination side IP address, and the both sides starts an Internet call.

(7) After start of the Internet call, the TA 102 and 105 send out a cut-off signal to the call setting sent from each side in order to terminate the mutual call settings, and layer 3 message for telephone call on the ISDN is closed.

The conventional Internet telephone system involves the following problems.

(1) The ISDN communication charge and the Internet connection charge at the destination side are at a charge of the destination party, and it is hard to obtain understanding.

(2) Call is possible only to the telephone set connected to the ISDN TA.

SUMMARY OF THE INVENTION

It is hence an object of the invention to present an Internet telephone system allowing the destination side telephone set to be free from ISDN communication charge and Internet connection charge, and allowing to make a call to a telephone set not connected to an ISDN terminal adapter (TA).

To solve the problems, the Internet telephone system of the invention comprises a calling side telephone set, a calling side ISDN TA connected to the calling side telephone set, a destination side ISDN TA for receiving a notice of a user-user information notice or a call setting from the calling side ISDN TA, and a destination side telephone set connected to the destination side ISDN TA, and makes an Internet call in the following procedure.

The calling side ISDN TA:

(1) judges if the destination is accessible to an Internet call or not when the telephone number of the destination side telephone set is specified by the calling side telephone set, and (2) if judging that an Internet call is possible, sets the predetermined number, Internet connection member identification number and password, on the user-user information notice or the sub-address of the call setting, and sends out to the destination side ISDN TA.

The destination side ISDN TA:

(1) rings the bell of the destination side telephone set when receiving the predetermined number set on the user-user information notice or the sub-address of the call setting, (2) connects to the access point of the destination side provider by the transmitted Internet connection member identification number and password when the destination side telephone set is hooked up, and (3) transmits the destination side IP address acquired at the destination side access point to the calling side ISDN TA by putting the destination side IP address on the sub-address of the call setting or by user-user information notice.

The calling side ISDN TA:

(1) receives the destination side IP address, and connects to the access point of the calling side provider, and (2) makes an Internet call by transmitting the calling side IP address acquired at the calling side access point to the destination side on the Internet.

The destination side telephone set utilizes the Internet connection member identification number and password sent from the calling side telephone set.

Further, the Internet telephone system of the invention comprises a calling side telephone set, a calling side ISDN TA connected to the calling side telephone set, a destination side ISDN TA for receiving a call setting from the calling side ISDN TA, and a destination side telephone set connected to the destination side ISDN TA, in which destination side ISDN terminal adapter makes a call to the exchange network in the own local region when receiving a call setting of Internet call from the calling side ISDN TA.

BRIEF DESCRIPTION OF THE DRAWINGS

FIG. 10 is a password registration diagram showing an example of changing the password for every destination party.

FIG. 13 is a telephone number registration diagram showing an example of dial-up telephone number for notifying simultaneously when transmitting a credit call to the destination side ISDN terminal adapter.

DESCRIPTION OF THE PREFERRED EMBODIMENTS (Embodiment 1)

Figure 1:
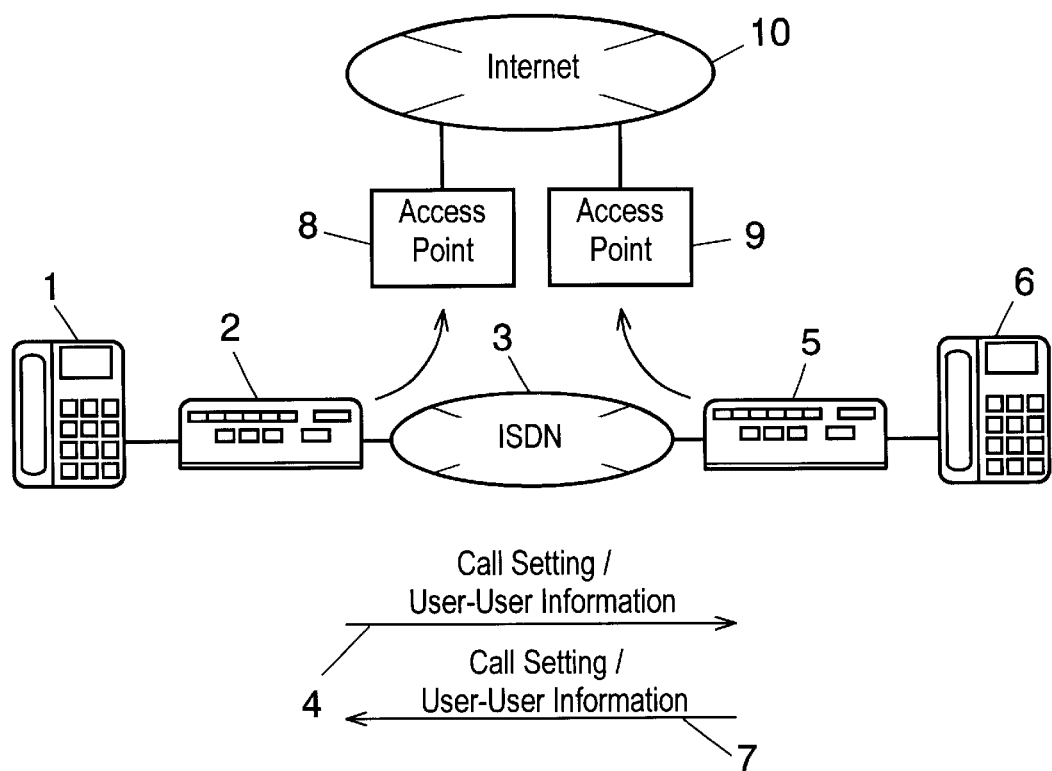
FIG. 1 is a structural diagram showing an Internet telephone system according to embodiment 1 of the invention.

FIG. 1 is a structural diagram showing an Internet telephone system according to embodiment 1 of the invention.

As shown in FIG. 1, the Internet telephone system in embodiment 1 comprises a calling side ISDN terminal adapter (TA) 2 connected to an access point 8 of ISDN 3 and Internet 10, a calling side telephone set 1 connected to the TA 2, a destination side ISDN terminal adapter (TA) 5 connected to an access point 9 of ISDN 3 and Internet 10, and a destination side telephone set 6 connected to the TA 5.

Figure 2:
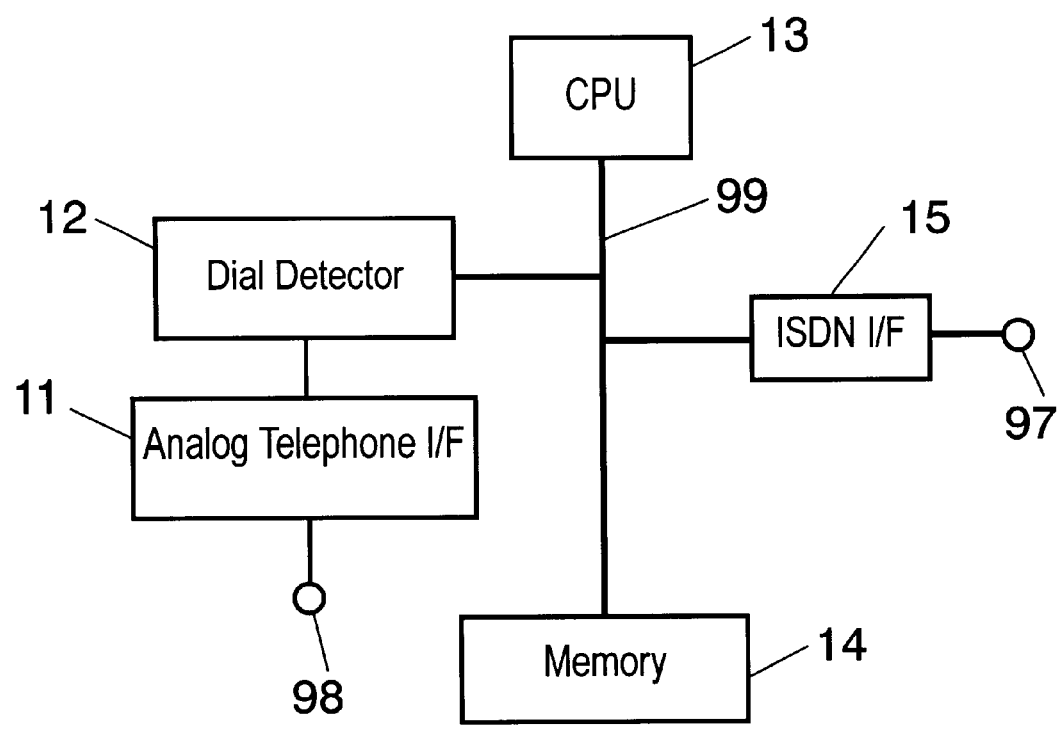
FIG. 2 is an essential block diagram of ISDN terminal adapters 2, 5 in FIG. 1.

FIG. 2 is an essential block diagram of ISDN terminal adapters 2, 5 in FIG. 1.

In FIG. 2, an analog telephone interface (I/F) 11, a tone and pulse dial detector 12, a CPU 13, an Internet telephone enable telephone number memory 14, and an ISDN interface (I/F) 15 are connected through a bus 99.

Figure 4:
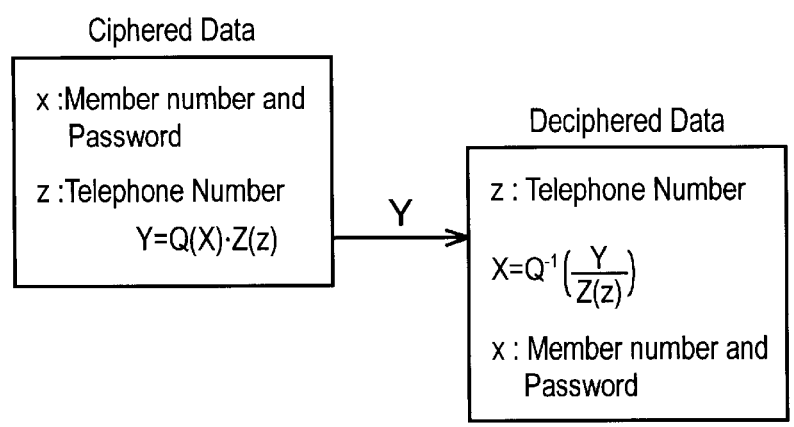
FIG. 4 is a diagram showing calling side ciphered data and destination side deciphered data.

The number dialed from the calling side telephone set 1 is put into a terminal 98. The dial number is put into the tone and pulse dial detector 12 through the I/F 11, the data is digitized. The digitized dial number is judged by the CPU 13 if matching or not with the Internet telephone number stored in the Internet telephone enable telephone number memory 14. If not matching, an ordinary call setting is sent from the I/F 15, and an ordinary telephone call is possible. If matching, the predetermined number, the Internet connection member identification number and password are ciphered. And the call setting 4 including the ciphered (see FIG. 4) data (preliminarily determined number, Internet connection member identification number and password) and layer 3 sub-address of ISDN is sent out from the I/F 15 to the TA 5. The ciphered data is deciphered in the TA 5.

In the embodiment, the call setting includes the sub-address, but the same operation is possible by using the user-user information notice of the ISDN.

Figure 3:
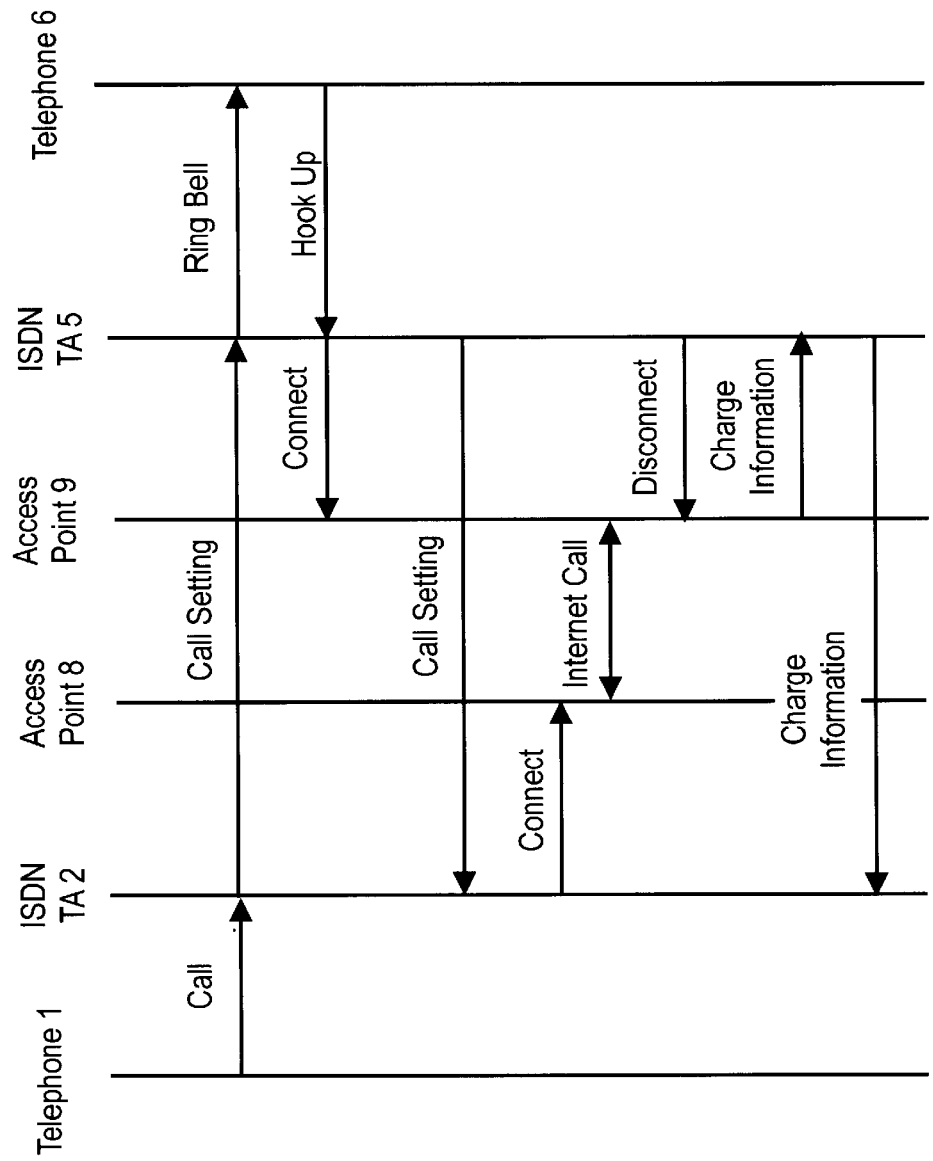
FIG. 3 is a sequence diagram showing the operation of the Internet telephone system in embodiment 1 of the invention.

The procedure and operation of the Internet telephone system having such configuration are explained by referring to FIG. 3.

FIG. 3 is a sequence diagram showing the operation of the Internet telephone system in embodiment 1 of the invention.

(1) The TA 2, receiving a call from the telephone set 1, judges if the telephone number specified by the telephone set 1 is an Internet telephone accessible destination party or not.

(2) When the TA 2 judges that Internet call is possible, it sets the predetermined number, and the ciphered Internet connection member identification number and password on the user-user information notice or the sub-address of the call setting 4, and sends out to the TA 5.

(3) The TA 5 rings the bell of the destination side telephone set 6 when the predetermined number is transmitted by the call setting 4 or user-user information notice.

(4) At the destination side, when the user hooks up the telephone set 6, the TA 5 connects to the access point 9.

At this time, the Internet connection member identification number and password of the provider used for connection are the transmitted Internet connection member identification number and password.

(5) After connecting to the access point 9, the TA 5 sets the predetermined number and the IP address acquired at the destination side access point 9 on the sub-address of the call setting 7 or the user-user information notice, and sends out to the TA 2.

(6) The TA 2, when receiving the predetermined number and the IP address acquired at the TA 5, connects to the access point 8.

(7) After connecting to the access point 8, the TA 2 transmits the calling side IP address acquired at the calling side access point 8 to the destination side access point 9, and a mutual Internet call is started between the telephone set 1 and telephone set 6.

(8) After start of Internet call, in order to terminate the mutual call settings, a cut-off signal is sent out to each call setting, and layer 3 message for telephone call on the ISDN is closed. The Internet connection member identification number and password are stored in the memory (not shown) of the calling side ISDN terminal adapter 2.

Thus, according to embodiment 1, the destination side telephone set 6 makes use of the Internet connection member identification number and password sent from the calling side telephone set 1, and therefore the ISDN communication charge and Internet connection charge can be transmitted to the calling side telephone set 1 by using the Internet connection member identification number and password sent from the calling side telephone set 1, and therefore the destination side telephone set 6 is free from ISDN communication charge and Internet connection charge.

As the key for ciphering and deciphering the Internet connection member identification number and password, the calling side telephone number is used. Hence, on the ISDN circuit, the Internet connection member identification number and password are unknown.

The calling side ISDN TA 2 and telephone set 1 are shown as separate members, but they may be formed also in one body.

The destination side ISDN TA 5 and telephone set 6 are shown as separate members, but they may be formed also in one body.

(Embodiment 2)

Figure 5:
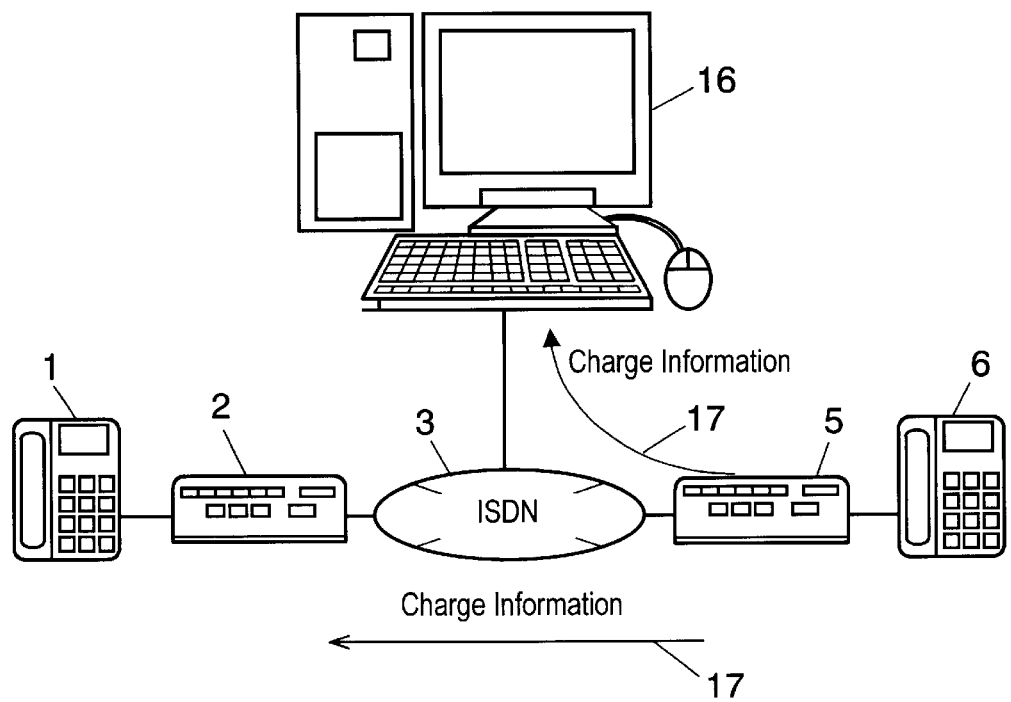
FIG. 5 is a structural diagram showing an Internet telephone system according to embodiment 2 of the invention.

FIG. 5 is a structural diagram showing an Internet telephone system according to embodiment 2 of the invention.

In FIG. 5, the calling side telephone set 1, ISDN network 3, and destination side telephone set 6 are same as in FIG. 1, and are hence identified with same reference numerals and description is omitted.

In FIG. 5, in addition to the structure of FIG. 1, a charge information center 16 is further provided as means for calculating the charge connected to the ISDN. In FIG. 5, the parts relating to the Internet (Internet 10 and access points 8, 9) are omitted.

Figure 6:
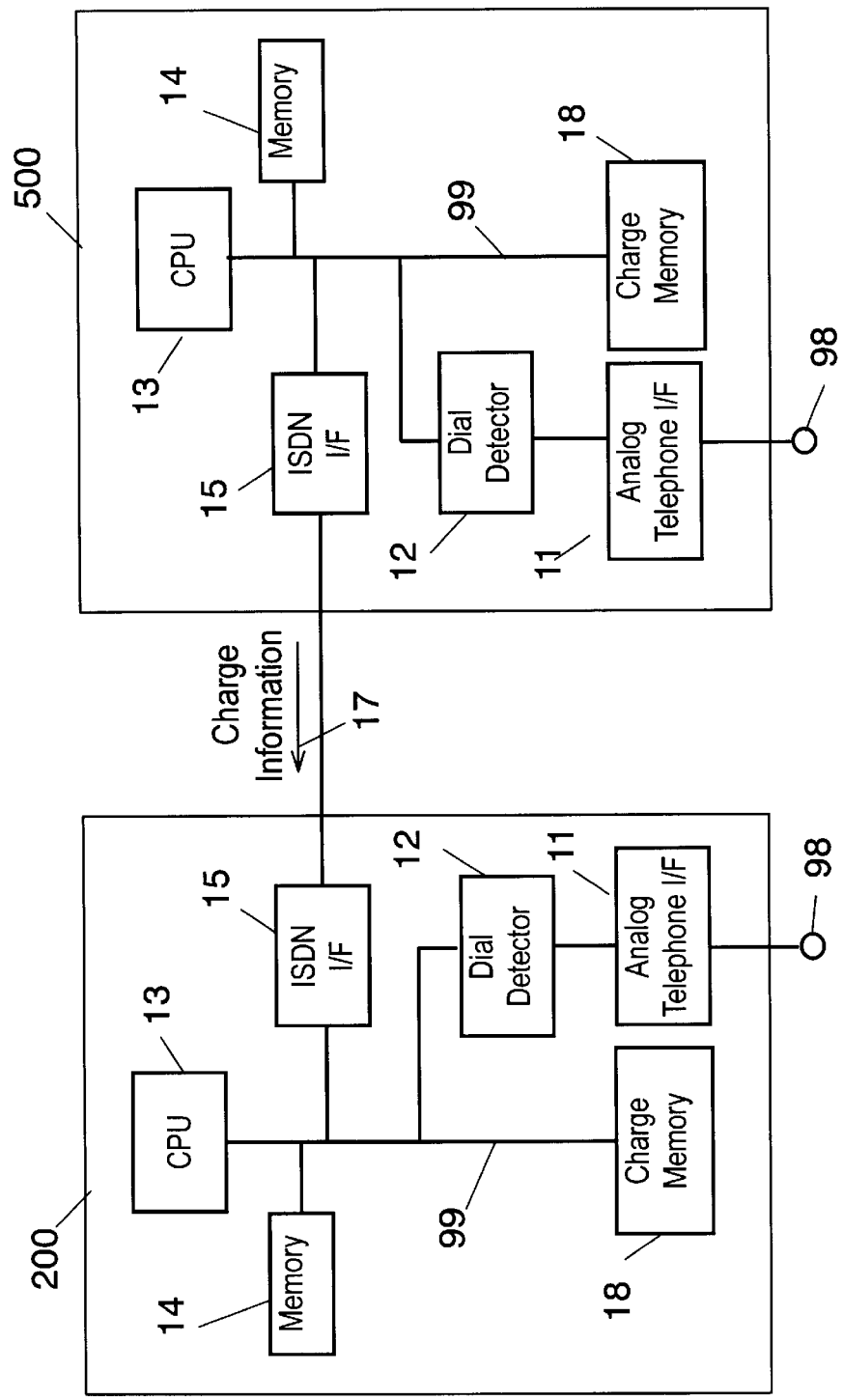
FIG. 6 is an essential block diagram of ISDN terminal adapters 200, 500 in FIG. 5.

FIG. 6 is an essential block diagram of calling side ISDN TA 200 and destination side TA 500 in FIG. 5. The TA 200 and 500 of the embodiment are similar to the TA 2 and 5 in embodiment 1, except that call charge memories 18 are further provided.

In FIG. 6, the analog telephone interface 11, tone and pulse dial detector 12, Internet telephone enable telephone number memory 14, CPU 13, ISDN interface 15, terminals 97, 98, and bus 99 are same as shown in FIG. 2, and are identified with same reference numerals and description is omitted.

The ISDN terminal adapters 200, 500 of the Internet telephone system of the embodiment are explained.

In embodiment 2, the operation is same as in embodiment 1 until the Internet call is terminated.

After the Internet call, the charge information 17 consisting of the ISDN communication charge during the Internet connection and the Internet connection charge (or Internet connection time) is stored in the destination side call charge memory 18. The charge information 17 is transmitted to the calling side TA 200 through the user-user information notice. As a result, the cost charged at the destination side is stored in the calling side call charge memory 18. By transmitting this charge information 17 to the charge information center 16, the expense can be settled later.

Thus, according to embodiment 2, the destination side ISDN terminal adapter 500, after terminating the Internet call and cutting off connection to the Internet, stores the ISDN communication charge and Internet connection charge during the Internet call in the call charge memory 18 in the calling side ISDN terminal adapter 200 or in the memory of the charge information center 16. Therefore, the expense can be settled later, so that the destination side telephone set 6 is free from the ISDN communication charge and Internet connection charge.

(Embodiment 3)

Figure 7:
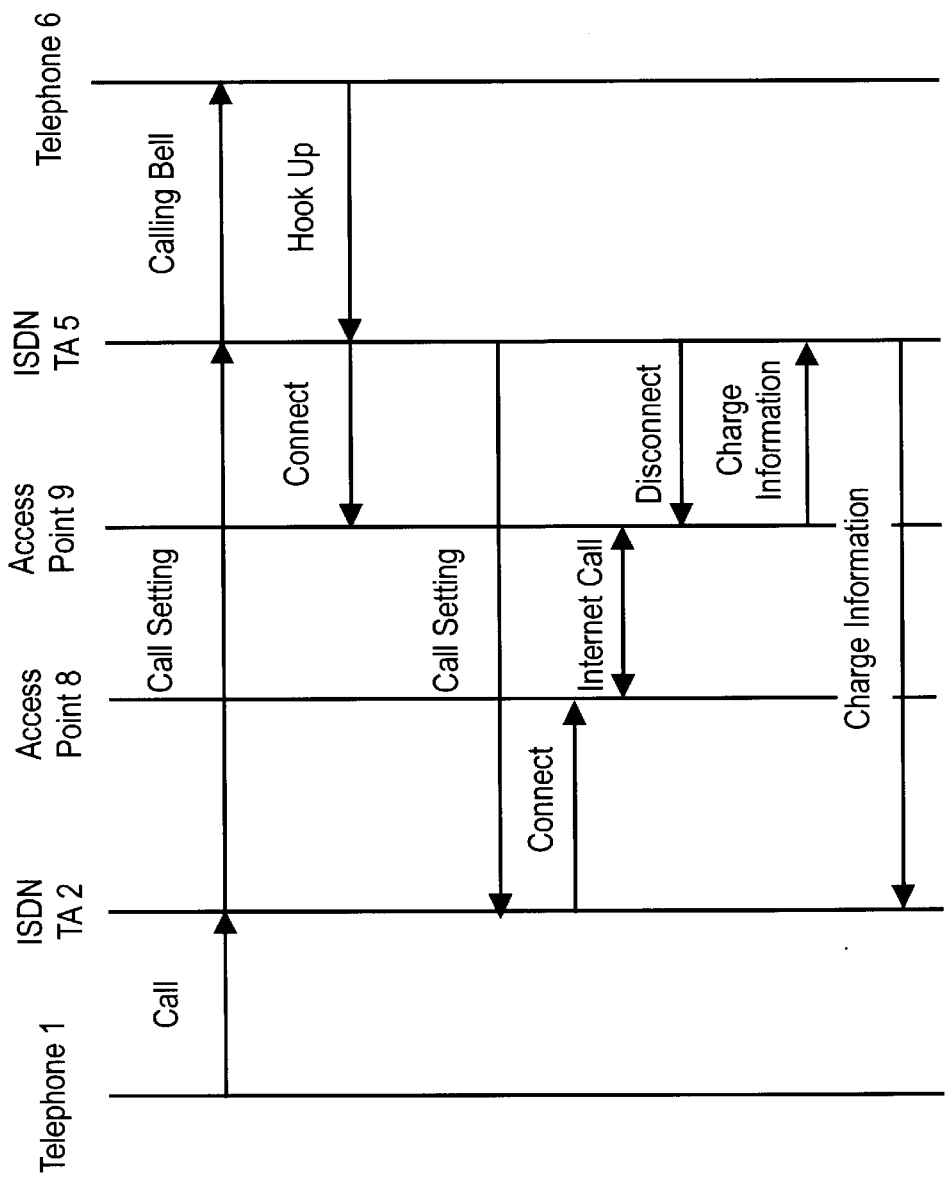
FIG. 7 is a sequence diagram showing the operation of an Internet telephone system in embodiment 3 of the invention.

The configuration of the Internet telephone system in embodiment 3 of the invention is same as in FIG. 1 and FIG. 2, and its description is omitted. FIG. 7 is a sequence diagram showing the operation of the Internet telephone system in embodiment 3 of the invention.

In embodiment 3, for Internet connection at the destination side, credit communication is used in ISDN communication charge.

The credit communication is a service of a telephone company, that is, when making a telephone call, by sending the own credit communication member number, its password, and the destination side telephone number to the telephone network, if using a telephone line owned by a third party, the user can communicate by transferring the charge to the own telephone set.

In FIG. 7, the ciphered credit communication member number and its password are sent from the TA 2. On the basis of this information, the TA 5 deciphers the transmitted ciphered information, and connects to the access point 9 for Internet connection by using this credit communication. The calling side TA 2 connects to the access point 8, and mutual communication is started. In this case, the charge is transferred to the calling side telephone set 1 by the telephone company.

The credit communication member number and its password are stored in the memory (not shown) of the TA 2.

As clear from embodiment 3, charging on the calling side telephone set is possible.

(Embodiment 4)

Figure 8:
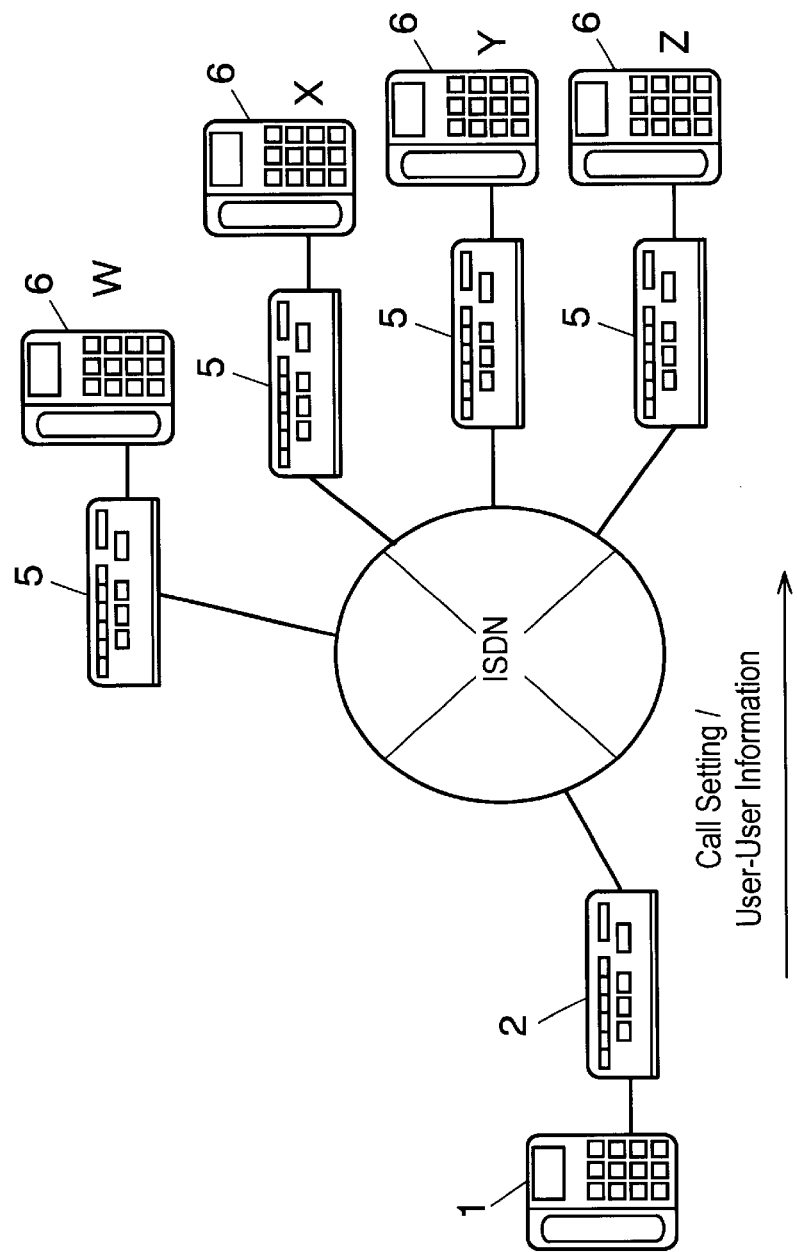
FIG. 8 is a structural diagram showing an Internet telephone system according to embodiment 4 of the invention.

FIG. 8 is a structural diagram showing an Internet telephone system according to embodiment 4 of the invention. In FIG. 8, the Internet relating parts (Internet 10, access points 8, 9) are omitted.

In FIG. 8, the calling side telephone set 1, calling side ISDN TA 2, ISDN network 3, destination side ISDN TA 5, and destination side telephone set 6 are same as in FIG. 1, and are hence identified with same reference numerals and description is omitted. In FIG. 8, four sets of destination side ISDN TA 5 and destination side telephone set 6 are located in regions W, X, Y, and Z.

Figure 9:
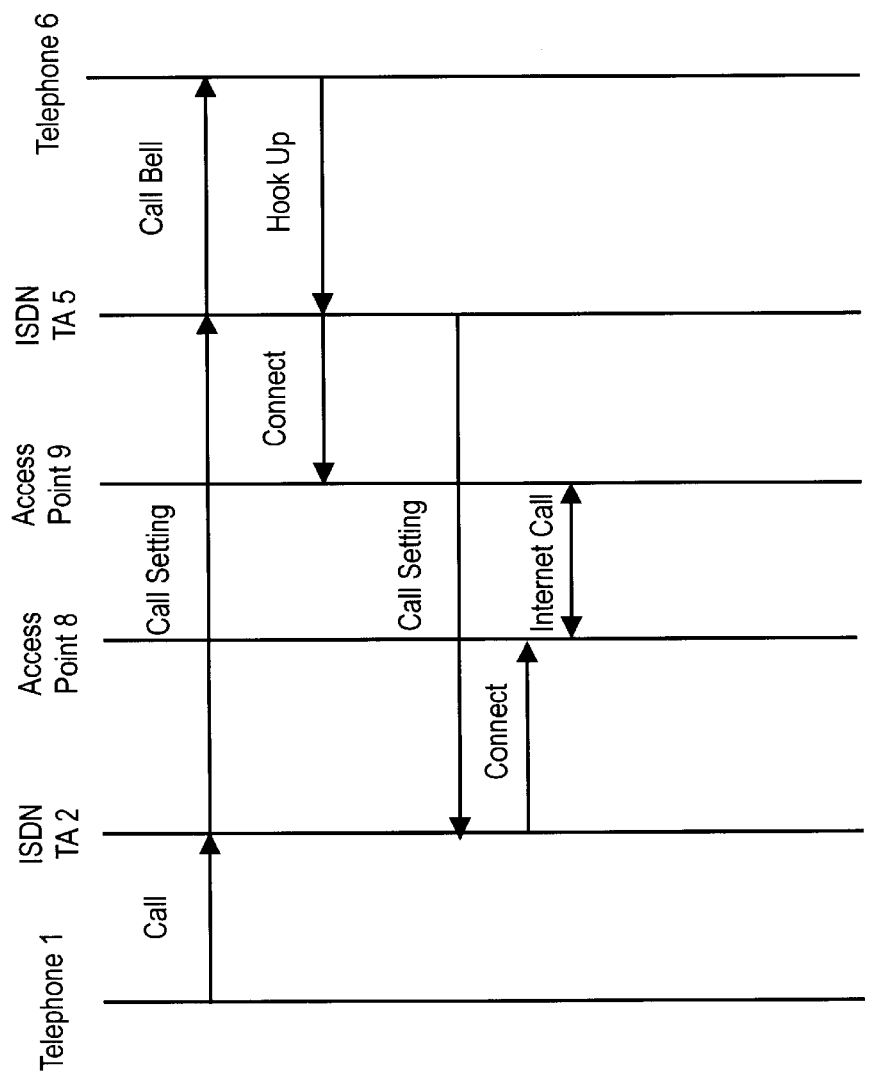
FIG. 9 is a sequence diagram showing the operation of the Internet telephone system in embodiment 4 of the invention.

FIG. 9 is a sequence diagram showing the operation of the Internet telephone system in embodiment 4 of the invention.

In this embodiment, different from embodiment 3, the password of credit communication is changed for every different calling destination. The other is same as in embodiment 3 and description is omitted.

Figure 10:
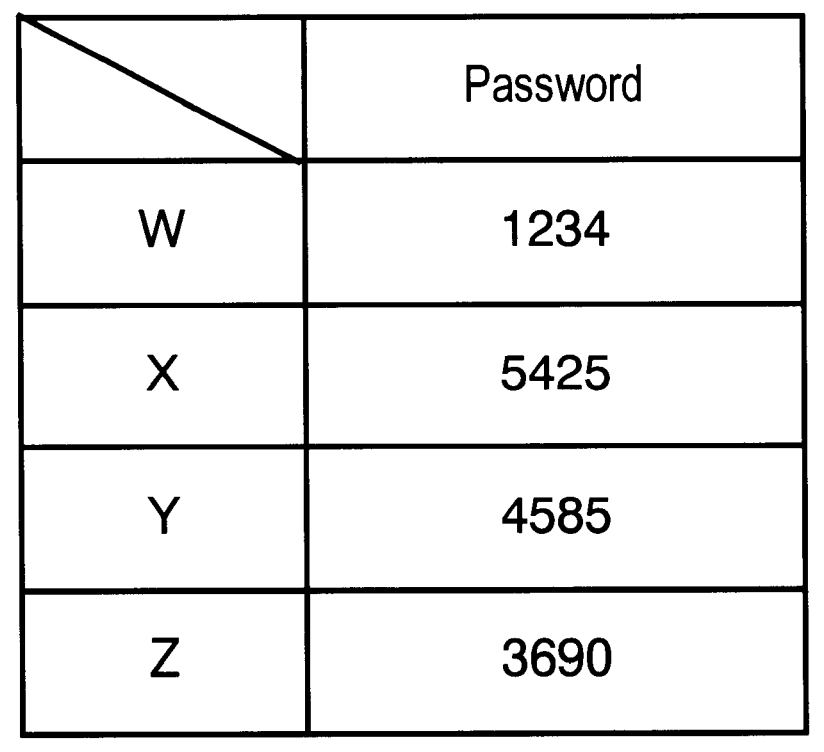

FIG. 10 is a password registration diagram showing an example of changing the password for every destination party. The password of the credit for every destination party is stored in the memory (not shown) of the calling side ISDN TA.

As shown in FIG. 10, the password of credit communication is changed for every destination party. Up to ten passwords are assigned at the present, for example, by NTT.

By varying the password of the credit for every destination party, in case the credit communication member number and its password are stolen and used illegally, the transmitting region is identified from the password. Hence the region of crime is specified, and illegal use can be prevented.

(Embodiment 5)

Figure 11:
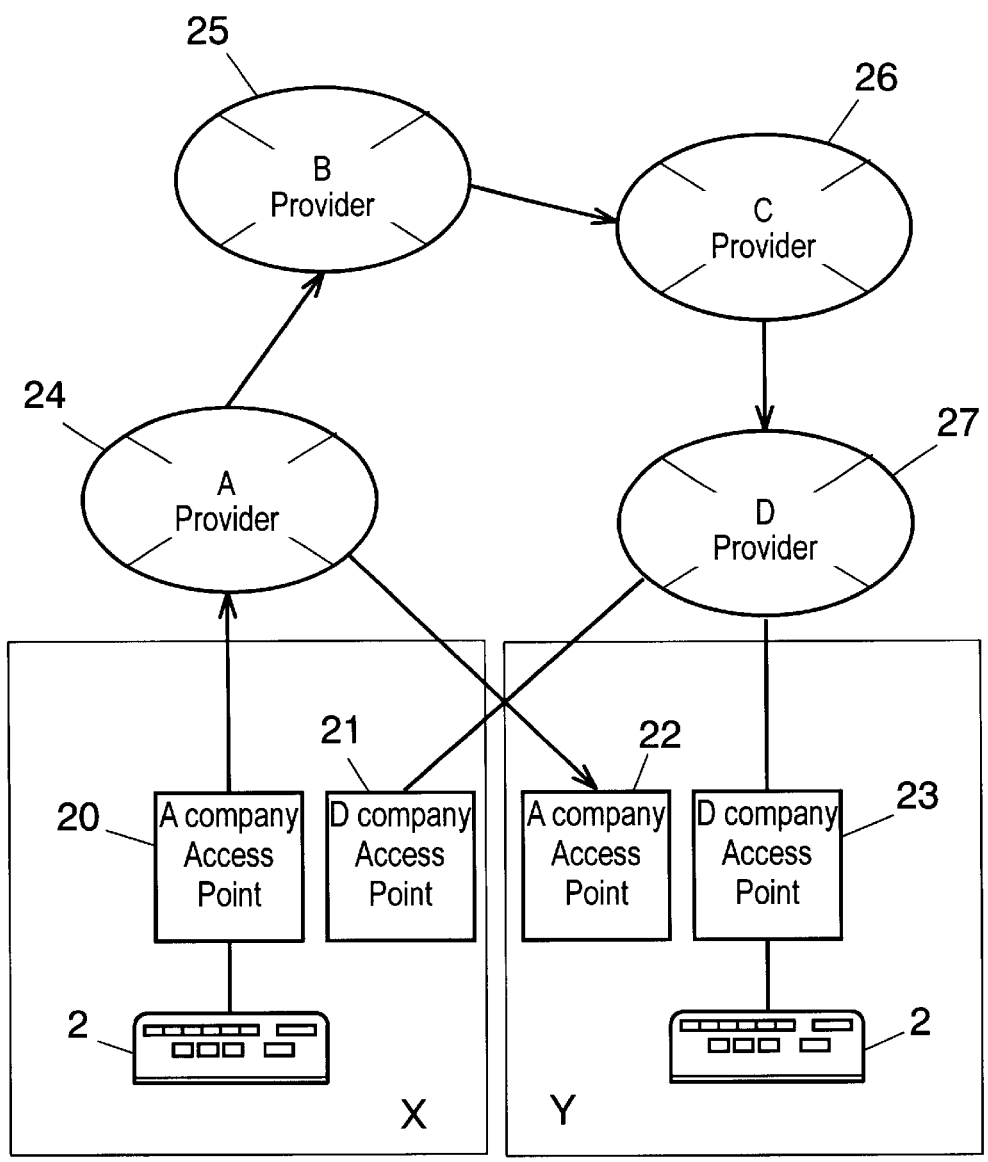
FIG. 11 is a packet path diagram showing a packet path when making an Internet call by connecting the access point of a same provider.
Figure 12:
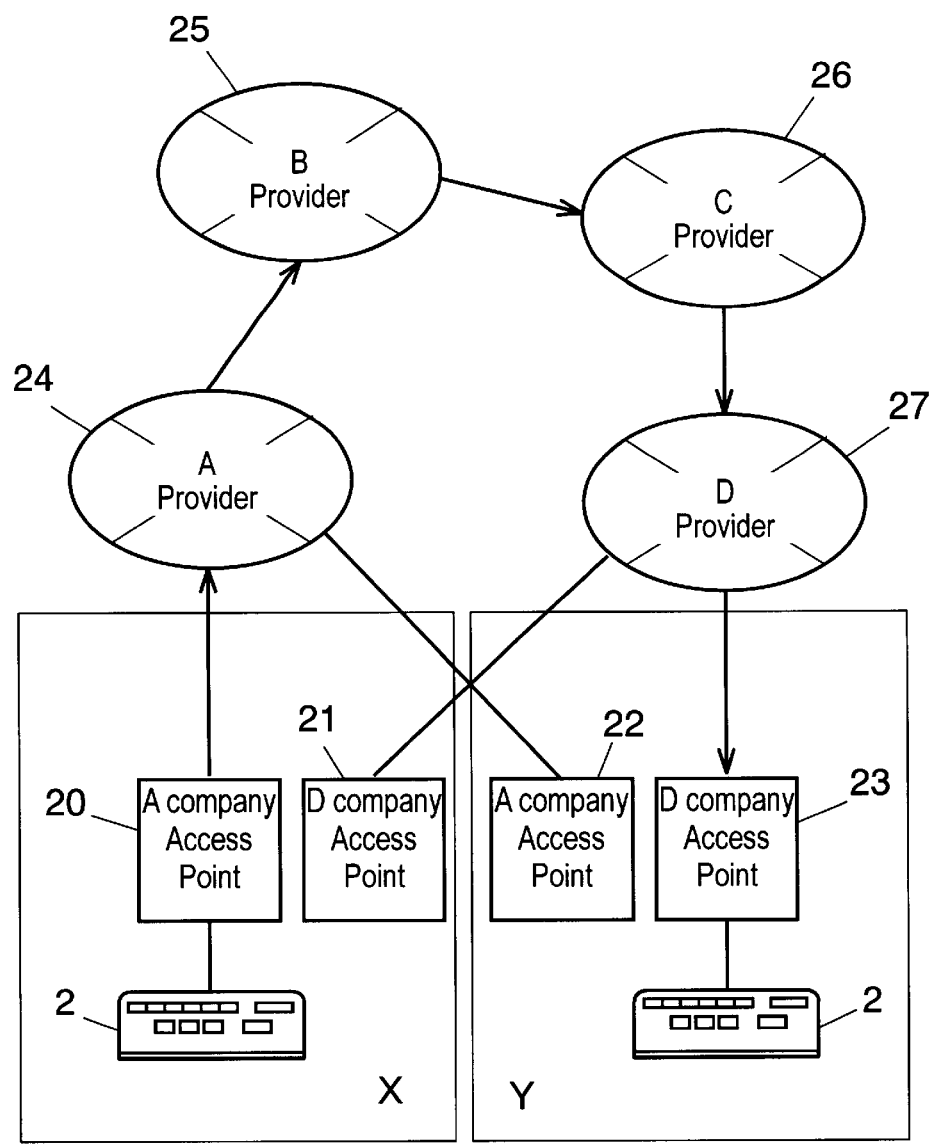
FIG. 12 is a packet path diagram showing a packet path when making an Internet call by connecting plural Internet providers.

An Internet telephone system according to embodiment 5 of the invention is same as in FIG. 1 and FIG. 2, and its description is omitted. FIG. 11 is a packet path diagram showing a packet path when making an Internet call by connecting the access point of a same provider, FIG. 12 is a packet path diagram showing a packet path when making an Internet call by connecting plural Internet providers.

FIG. 13 is a telephone number registration diagram showing an example of dial-up telephone number for notifying simultaneously when transmitting a credit call to the destination side TA 5. As shown in FIG. 13, the dial-up telephone number for Internet connection for transmitting to the destination party is limited to the access point of company A. That is, as shown in FIG. 11, the TA 2 in region X is connected to an access point 20 of company A located in region X, and communicates with the TA 2 connected to an access point 22 of company A located in region Y through a provider network 20 of company A, and hence the packet loss hardly occurs because only few nodes are passed through. If communicating between different providers, as shown in FIG. 12, many nodes are passed through, and hence the packet loss or delay is likely to occur.

The dial-up telephone number is stored in the memory (not shown) of the calling side ISDN TA 2.

Thus, according to the embodiment, in the calling side ISDN TA 2, by limiting the access point of credit communication (herein, limiting to the access point of company A), and limiting the connection destination of Internet communication by credit communication of the destination party to one provider (herein, the provider network of company A), packet loss and delay on the Internet can be decreased.

(Embodiment 6)

Figure 14:
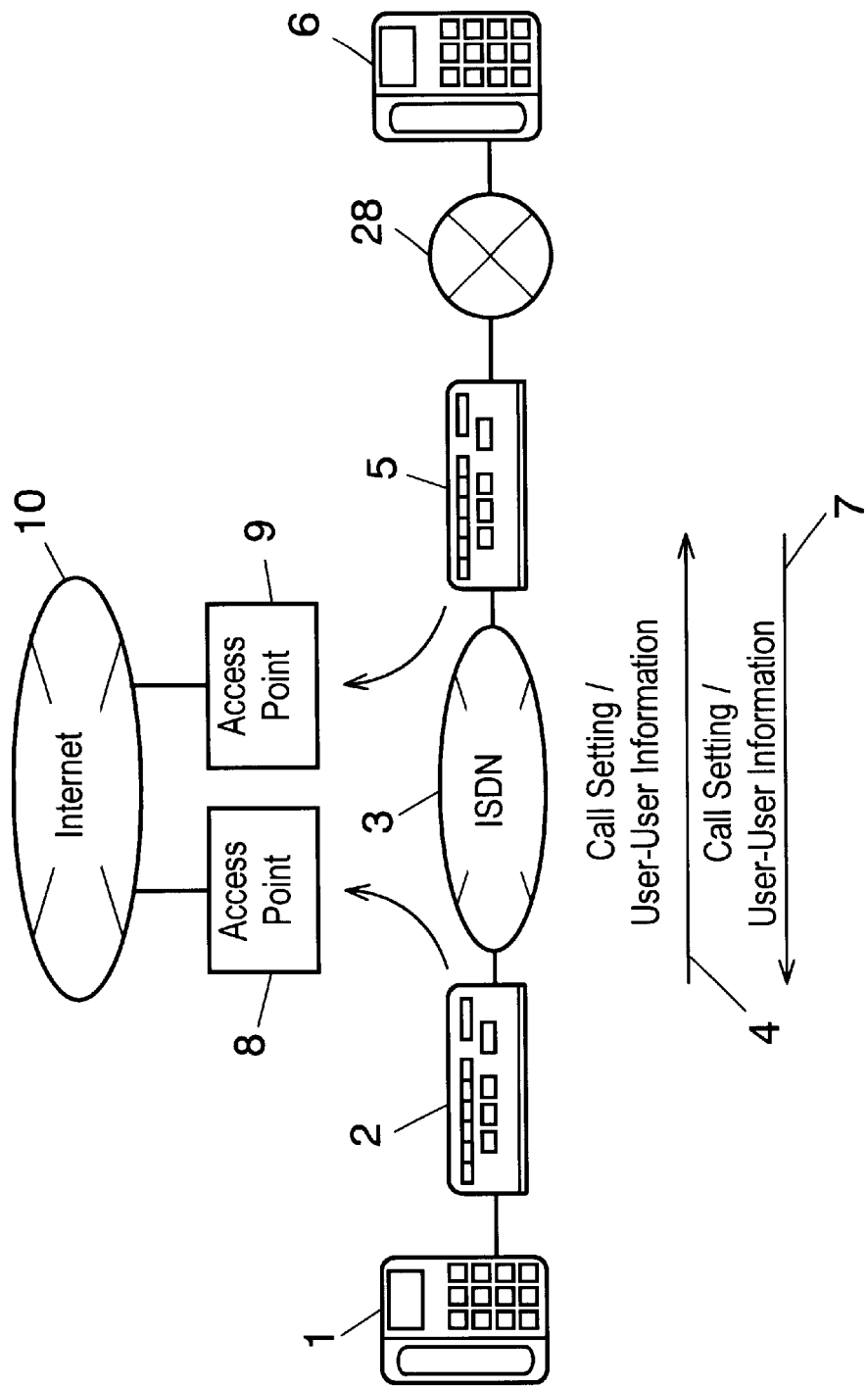
FIG. 14 is a structural diagram showing an Internet telephone system according to embodiment 6 of the invention.

FIG. 14 is a structural diagram showing an Internet telephone system according to embodiment 6 of the invention. In FIG. 14, the calling side telephone set 1, calling side ISDN TA 2, ISDN network 3, call setting or user-user information notice 4, destination side ISDN TA 5, destination side telephone set 6, call setting or user-user information notice 7, calling side access point 8, destination side access point 9, and Internet 10 are same as in FIG. 1, and are hence identified with same reference numerals and description is omitted. The Internet telephone system of the embodiment is composed by adding a local exchange network 28 to the Internet telephone system in embodiment 1.

Figure 15:
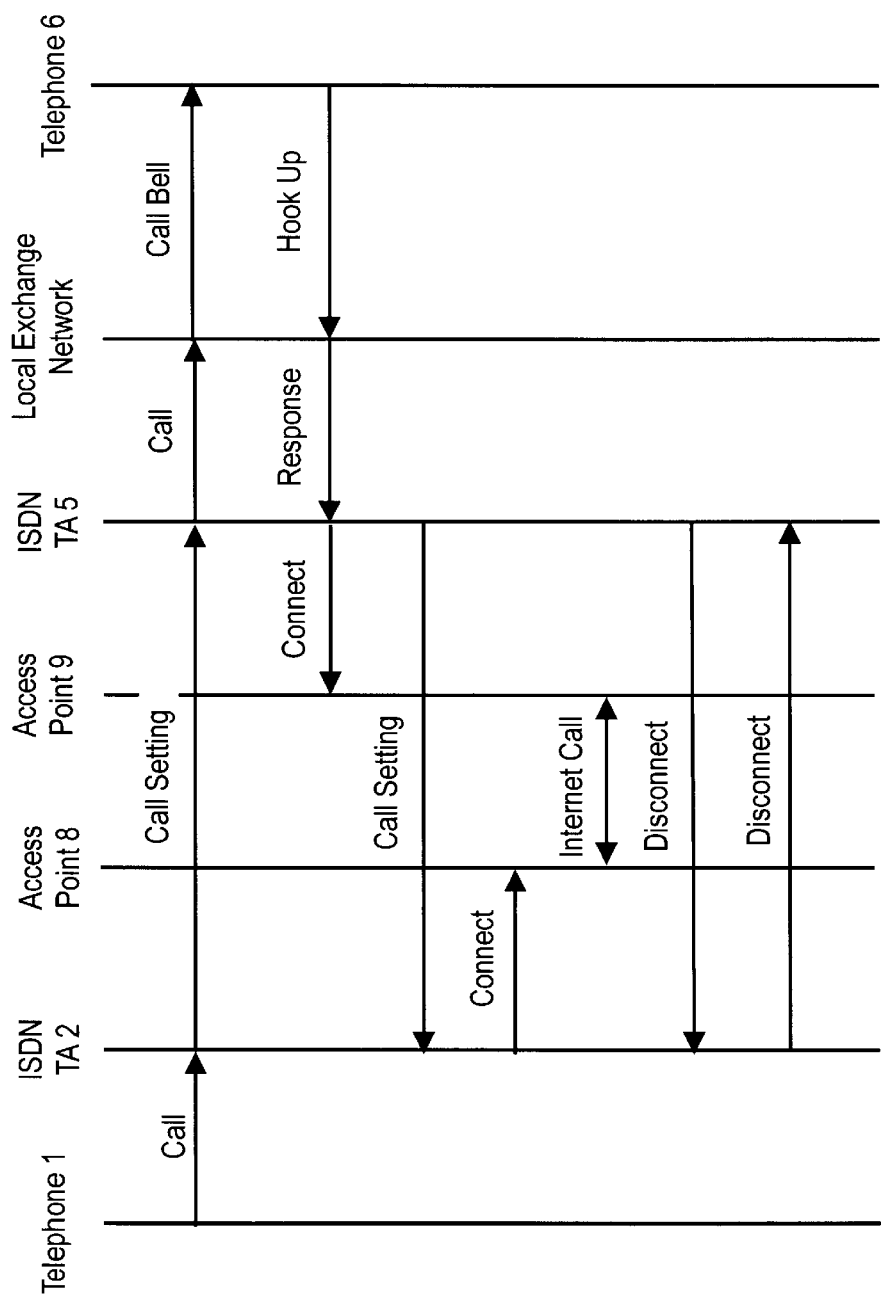
FIG. 15 is a sequence diagram showing the operation of the Internet telephone system in FIG. 14.
Figure 16:
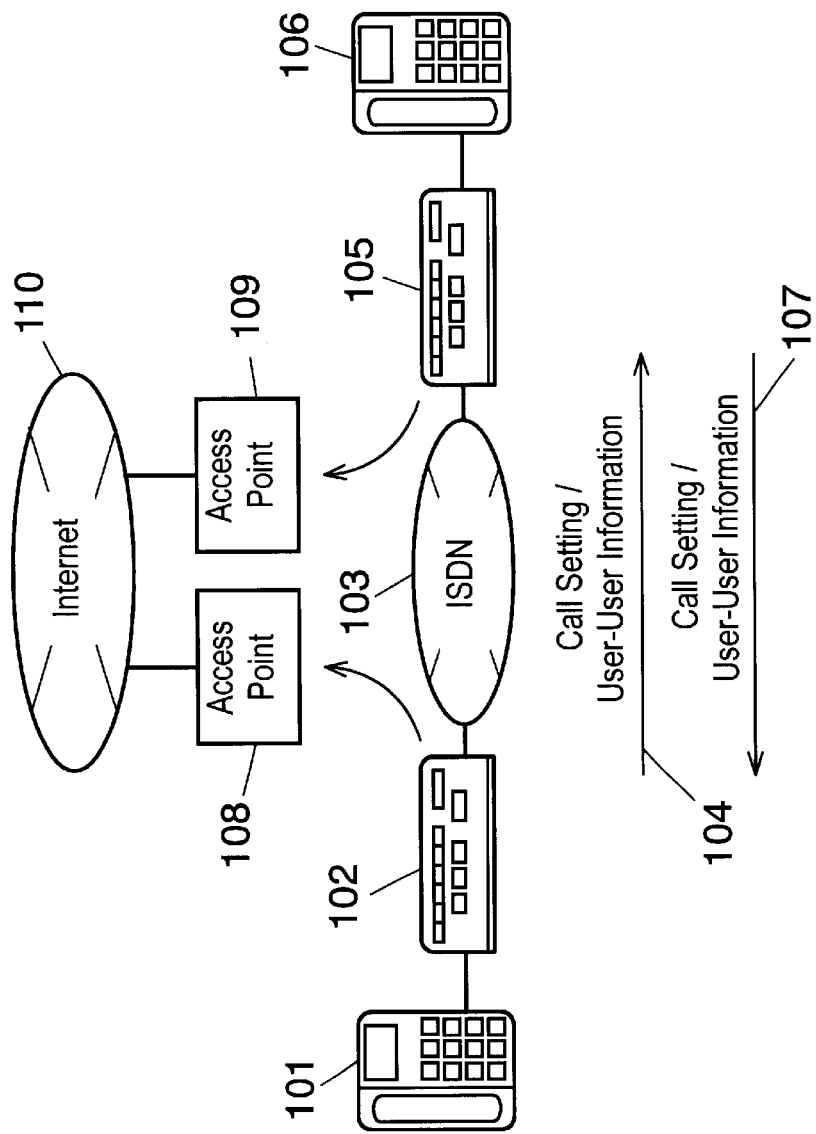
FIG. 16 is a structural diagram showing a conventional Internet telephone system.
Figure 17:
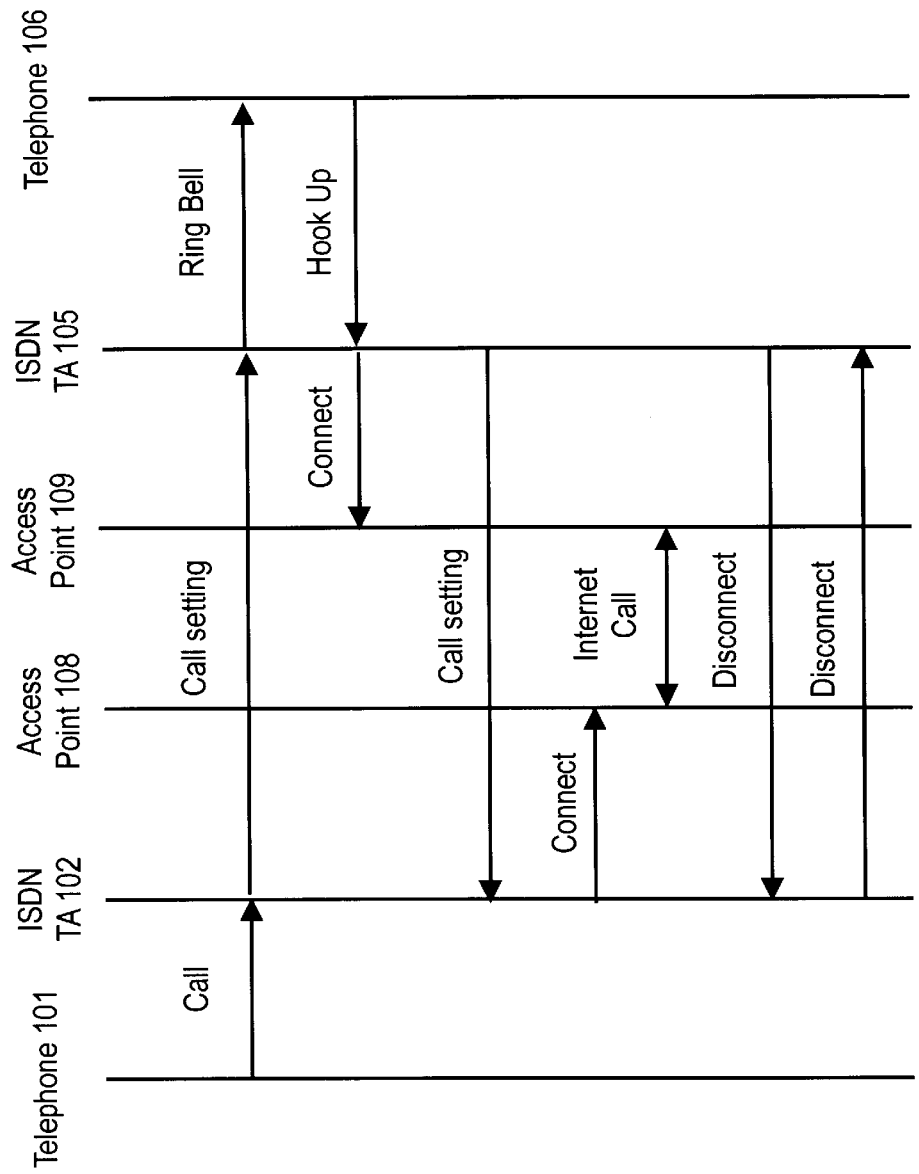
FIG. 17 is a sequence diagram showing the operation of the Internet telephone system in FIG. 16.

In thus composed Internet telephone system, the operation is explained by referring to FIG. 15. FIG. 15 is a sequence diagram showing the operation of the Internet telephone system in FIG. 14.

As shown in FIG. 15, when making a call from the calling side telephone set 1 to the telephone set 6 located the region of the TA 5, the TA 2 judges if the charge is cheaper by calling through the Internet or not. If judged to be lower in charge, the call setting containing the predetermined number and the destination side telephone number in the sub-address is transmitted to the TA 5. At the TA 5, if one more line is empty in channel B of the ISDN network, making a call to the local exchange network 28 by using channel B, when the destination telephone answers, the Internet call is started. Otherwise, if channel B is not empty or the destination side telephone set 6 is busy, a cut-off signal is returned to the call setting. In this case, the TA 2 changes over to an ordinary telephone, and transmits to the destination party.

Thus, according to the embodiment, when the TA 5 receives a call setting of Internet call from the TA 2, it is designed to make a call to the exchange network in the own region, so that it is possible to talk with the destination side telephone set 6 not connected to the ISDN terminal adapter.

What is claimed is:

1. An Internet telephone system comprising a calling side telephone set, a calling side ISDN terminal adapter connected to said calling side telephone set, a destination side ISDN terminal adapter for receiving a user-user information notice or a call setting from said calling side ISDN terminal adapter, and a destination side telephone set connected to said destination side ISDN terminal adapter, wherein said calling side ISDN terminal adapter:

judges if the destination is accessible to an Internet call or not when the telephone number of said destination side telephone set is specified by said calling side telephone set, and if judging that an Internet call is possible, sets the predetermined number, Internet connection member identification number and password, on said user-user information notice or a sub-address of call setting, and sends out to said destination side ISDN terminal adapter, said destination side ISDN terminal adapter:

when receiving said predetermined number set on said user-user information notice or sub-address of the call setting, and said destination side telephone set is hooked up, connects to an access point of the destination side provider by the transmitted Internet connection member identification number and password, and transmits the destination side IP address acquired at said destination side access point to said calling side ISDN terminal adapter by putting said destination side IP address on the sub-address of the call setting or by the user-user information notice, said calling side ISDN terminal adapter:

receives said destination side IP address, and connects to a calling side access point of the calling side provider, makes an Internet call by transmitting the calling side IP address acquired at said calling side access point to said destination side IP address on the Internet, and said destination side telephone set;

utilizes said Internet connection member identification number and password sent from said calling side telephone set:

wherein said destination side ISDN terminal adapter:

when terminating the Internet call and closing connection to the Internet, transmits the ISDN communication charge and the Internet connection charge during the Internet call, to said calling side ISDN terminal adapter or charge information center by user-user information notice, and stores in a call charge memory in said calling side ISDN terminal adapter or a memory in the charge information center.

2. The Internet telephone system of claim 1, wherein said destination side ISDN terminal adapter:

rings the bell of said destination side telephone set when receiving the predetermined number set on said user-user information notice or the sub-address of the call setting.

3. An Internet telephone system comprising a calling side telephone set, a calling side ISDN terminal adapter connected to said calling side telephone set, a destination side ISDN terminal adapter for receiving a user-user information notice or a call setting from said calling side ISDN terminal adapter, and a destination side telephone set connected to said destination side ISDN terminal adapter, wherein said calling side ISDN terminal adapter:

judges if the destination is accessible to an Internet call or not when the telephone number of said destination side telephone set is specified by said calling side telephone set, and if judging that an Internet call is possible, sets the predetermined number, Internet connection member identification number and password, on said user-user information notice or a sub-address of call setting, and sends out to said destination side ISDN terminal adapter, said destination side ISDN terminal adapter:

when receiving said predetermined number set on said user-user information notice or sub-address of the call setting, and said destination side telephone set is hooked up, connects to an access point of the destination side provider by the transmitted Internet connection member identification number and password, and transmits the destination side IP address acquired at said destination side access point to said calling side ISDN terminal adapter by putting said destination side IP address on the sub-address of the call setting or by the user-user information notice, said calling side ISDN terminal adapter:

receives said destination side IP address, and connects to a calling side access point of the calling side provider, makes an Internet call by transmitting the calling side IP address acquired at said calling side access point to said destination side IP address on the Internet, and said destination side telephone set:

utilizes said Internet connection member identification number and password sent from said calling side telephone set;

wherein said calling side ISDN terminal adapter:

ciphers and sends said Internet connection member identification number and password when making a call from the calling side telephone set to the destination side telephone set, and said destination side ISDN terminal adapter deciphers the transmitted Internet connection member identification number and password, and uses the Internet telephone.

4. The Internet telephone system of claim 3, wherein the calling side telephone number is used as the key for ciphering and deciphering of said Internet connection member identification number and password.

5. An Internet telephone system comprising a calling side telephone set, a calling side ISDN terminal adapter connected to said calling side telephone set, a destination side ISDN terminal adapter for receiving a user-user information notice or a call setting from said calling side ISDN terminal adapter, and a destination side telephone set connected to said destination side ISDN terminal adapter, wherein said calling side ISDN terminal adapter:

judges if the destination is accessible to an Internet call or not when the telephone number of said destination side telephone set is specified by said calling side telephone set, and if judging that an Internet call is possible, sets the predetermined number, Internet connection member identification number and password, on said user-user information notice or a sub-address of call setting, and sends out to said destination side ISDN terminal adapter, said destination side ISDN terminal adapter:

when receiving said predetermined number set on said user-user information notice or sub-address of the call setting, and said destination side telephone set is hooked up, connects to an access point of the destination side provider by the transmitted Internet connection member identification number and password, and transmits the destination side IP address acquired at said destination side access point to said calling side ISDN terminal adapter by putting said destination side IP address on the sub-address of the call setting or by the user-user information notice, said calling side ISDN terminal adapter:

receives said destination side IP address, and connects to a calling side access point of the calling side provider, makes an Internet call by transmitting the calling side IP address acquired at said calling side access point to said destination side IP address on the Internet, and said destination side telephone set:

utilizes said Internet connection member identification number and password sent from said calling side telephone set;

wherein said calling side ISDN terminal adapter:

when making a call from the calling side telephone set to the destination side telephone set, ciphers a credit communication member number and password of calling side ISDN channel, and sets the ciphered number and password on the sub-address of call setting or user-user information notice, and sends out to the destination side ISDN terminal adapter, and said destination side ISDN terminal adapter:

connects to the Internet with deciphered said credit communication member number and password.

6. The Internet telephone system of claim 5, wherein said calling side ISDN terminal adapter:

changes over said password for credit communication for every destination party in the case of a plurality of destination side telephone sets.

7. The Internet telephone system of claim 5, wherein said calling side ISDN terminal adapter:

limits the access point of credit communication, and also limits the Internet communication connection destination of credit communication for transmitting to the destination party to one provider.

8. The Internet telephone system of claim 6, wherein said calling side ISDN terminal adapter:

limits the access point of credit communication, and also limits the Internet communication connection destination of credit communication for transmitting to the destination party to one provider.

* * * * *